July 13, 1948.                E. M. SMITH                2,445,156
                    TEMPERATURE MEASURING INSTRUMENT
                         Filed Sept. 29, 1943
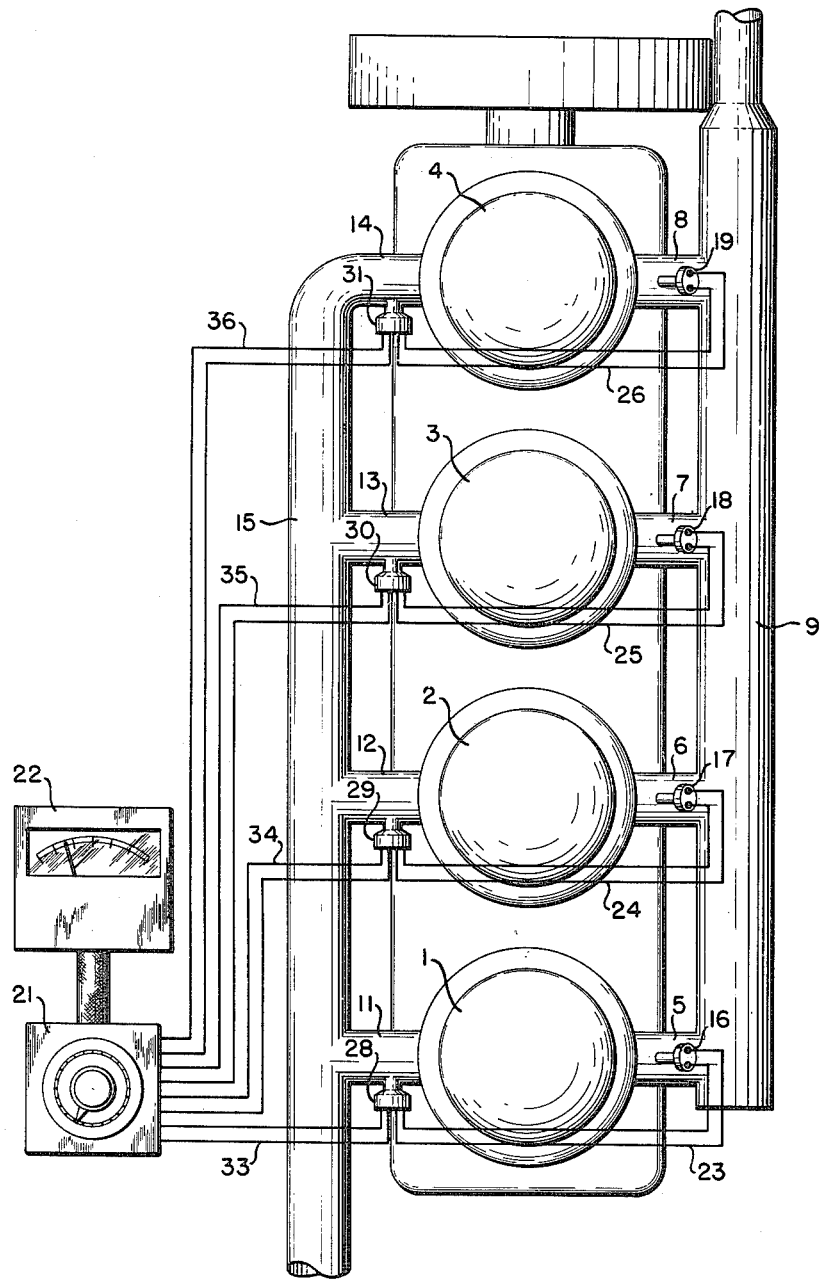
INVENTOR.
EDGAR M. SMITH
BY
ATTORNEY.

Patented July 13, 1948

2,445,156

UNITED STATES PATENT OFFICE 2,445,156

TEMPERATURE MEASURING INSTRUMENT

Edgar M. Smith, Trenton, N. J., assignor to The Brown Instrument Company, Philadelphia, Pa., a corporation of Pennsylvania Application September 29, 1943, Serial No. 504,281

3 Claims. (Cl. 73—341)

The present invention relates to pyrometry, and more particularly to the measurement of the exhaust gas temperatures of a Diesel engine or other engine in which such measurements are necessary or desirable.

In the operation of Diesel engines it is customary to measure the exhaust temperatures of each cylinder and to make suitable adjustments of each of the cylinders in accordance with the value of the temperature, with the idea that equal exhaust temperatures mean equal power output from each cylinder. It has been found, however, that equal exhaust temperatures for each cylinder do not necessarily mean that each cylinder is producing its proportional share of power. This is because, particularly in large engines, the temperature of the cooling water or other liquid which has a controlling effect on cylinder temperature may vary from end to end of the engine. The actual temperature of the exhaust gases from any cylinder above the temperature of the cooling water surrounding that cylinder is of importance, since this temperature difference may be kept constant even though the cylinder temperatures may vary. It can readily be seen that the cooling water temperature will have an effect on the exhaust temperatures. This is particularly true in marine engines which may operate from tropic to arctic waters.

Another cause of error that has been encountered in Diesel engines is due to the varying length of the thermocouple extension lead wires between the different cylinders and the pyrometer which is used to indicate or record the engine exhaust temperatures. This was caused by the practice of bringing all of the high resistance extension wires to the same point so that their cold junctions could be kept at the same temperature, regardless of the length that was necessary to accomplish this.

This invention has for an object the overcoming of the first mentioned difficulty by providing an arrangement in which each of the measuring elements used to measure the cylinder exhaust temperatures is used to measure the difference between the temperature of any one cylinder and that of the cooling water adjacent that cylinder. Thus if each of the exhaust temperatures is the same number of degrees above its reference temperature it will indicate that each cylinder is supplying its proper percentage of the total engine power.

It is a further object of the invention to provide an arrangement for measuring exhaust temperatures of an internal combustion engine using the engine cooling water adjacent each cylinder as a reference temperature for that cylinder. In this arrangement, even though the cooling water temperature may change from time to time and from cylinder to cylinder, if the engine is functioning properly each of the exhaust temperatures will be the same number of degrees above the water temperature.

It is a further object of the invention to measure the exhaust temperatures of a Diesel engine by means of a pyrometer using thermocouples, with the cold junctions of the thermocouples located in the engine cooling water.

It is a further object of the invention to provide a system for measuring exhaust temperatures in a Diesel engine in which the thermocouple extension lead wires may be made the same length, and in which different locations are used for each of the cold junctions, thus overcoming a source of error in previous installations of this type.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings the single figure of the drawing shows in a diagrammatic fashion the parts constituting my invention.

There is shown in the drawing a Diesel engine having four cylinders 1, 2, 3 and 4 each of which is provided with an exhaust pipe shown at 5, 6, 7 and 8 respectively. These exhaust pipes connect with an exhaust header 9 that leads to some suitable delivery point. The cylinders are also provided with cooling water inlets, 11, 12, 13 and 14 respectfully. Cooling water is supplied to individual cylinder inlets from a cooling water main 15.

As is customary in Diesel engine practice each of the cylinder exhaust pipes has located in it a thermocouple in order that the temperature of the exhaust of the individual cylinders may be measured. These thermocouples are connected to a rotary selector switch 21 that is in turn connected to an indicating instrument 22 which is preferably of the milli-voltmeter type; the switch ond indicating instrument being located adjacent one end of the engine. If a single cylinder engine is used, the rotary switch will be omitted.

It is the usual practice to connect the thermocouples directly with the selector switch and to have the cold junction for these thermocouples located in the switch or in a suitable compartment adjacent thereto. In the present case, however, each of the thermocouples 16, 17, 18 and 19 is connected by suitable thermocouple extension lead wires 23, 24, 25 and 26 respectively with cold junction boxes 28, 29, 30 and 31, each located adjacent the cooling water inlets to respective cylinders.

Each of these cold junction boxes is jacketed by water which is passing through that particular inlet pipe into the cylinder adjacent thereto. In this fashion the cold junction of the thermocouple measuring the exhaust temperature from a given cylinder is maintained at the temperature of the cooling water which is supplied to that cylinder. The thermocouple extension leads are connected to the rotary switch 21 from the various cold junction boxes by means of suitable low resistance leads 33, 34, 35 and 36, respectively, of different lengths.

It will thus be seen that each of the thermocouples taken in connection with the cold junction for this thermocouple will measure the temperature differences between the inlet water which is to cool the cylinder and the exhaust temperature from that cylinder. Thus any change in the temperature of the cooling water which is supplied to the cylinder that would have any tendency to produce a variation in the exhaust temperature is automatically compensated for. If the cooling water is supplied to each of the cylinders at the same temperature, and the cylinders are properly functioning, the temperature indicated by the instrument 22 will be the same for each of the cylinders. If, however, the cooling water temperature to one of the cylinders should vary and produce a corresponding change in the exhaust temperature the indicator will still read the same for this cylinder as it does for the other cylinders of the engine. It will therefore be seen that a reading which is directly pertinent to the temperature difference of the agents effecting the temperature of a given cylinder will be indicated by the instrument 22.

The lead wires extending from the thermocouple to the cold junction in any pyrometer system are always made of fairly high resistance wire. Thus if the lengths of these extension wires vary appreciably between the thermocouples and the cold junction, the instrument will give different readings even though the thermocouples may be at the same temperature. With the present invention this difficulty is overcome, since the lead wires 23, 24, 25 and 26 extending between the thermocouples and the cold junction boxes are all made exactly the same length. The extension wires 33, 34, 35 and 36 going from the cold junction boxes to the rotary switch may be made of a low resistance wire such as copper so that a variation of a good many feet between the lengths of these lead wires will not have a measurable effect on the readings that are made by the instrument. This is because the resistance of these lead wires is so small compared with the total resistance of the measuring circuit that it may be disregarded.

From the above description it will be seen that I have provided an exhaust temperature measuring system for Diesel engines which will give readings for the various cylinders that may be definitely related to each other so that the proper functioning of the engine may be insured.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that certain features of my invention may sometimes be used to advantage without a corresponding use of other features.

Having now described my invention, what I claim as new and desire to secure by Letters Patent is:

1. In a multiple cylinder internal combustion engine having a cooling water supply passage and having an individual exhaust gas passage for each cylinder, individual means for each cylinder responsive to the difference between the temperature of the exhaust gas passing through one of said exhaust gas passages and the temperature of the cooling water adjacent the same cylinder, a single exhibiting instrument, and means to connect selectively said responsive means to said exhibiting instrument.

2. For use with a multiple cylinder internal combustion engine having a cooling water supply passage and an individual exhaust gas passage for each cylinder, a thermocouple for each cylinder, each thermocouple having its hot junction located in the exhaust gas passage from one of said cylinders and having its cold junction located in the cooling water passage for the same cylinder, and means to exhibit the value of the temperatures to which said thermocouples are subjected.

3. For use with a multiple cylinder internal combustion engine having a cooling water supply passage leading to each cylinder and having an exhaust gas passage leading from each cylinder, a thermocouple for each cylinder, each thermocouple having its hot junction located in the exhaust gas passage of one of the cylinders and having its cold junction located in the cooling water passage of the same cylinder, thermocouple extension lead wires of substantially the same length extending between the hot and cold junctions of each thermocouple, a selector switch, low resistance leads of any necessary length extending between each thermocouple cold junction and said selector switch, and an exhibiting instrument adapted to be connected to any one of said thermocouples by said selector switch.

EDGAR M. SMITH.

REFERENCES CITED

The following references are of record in the file of this patent:

UNITED STATES PATENTS

| Number | Name | Date |
|---|---|---|
| 903,090 | Hopkins | Nov. 3, 1908 |
| 1,025,715 | Peake | May 7, 1912 |
| 1,263,308 | Bristol | Apr. 16, 1918 |
| 1,489,644 | Luscombe | Apr. 8, 1924 |
| 1,890,985 | Hamblen et al. | Dec. 13, 1932 |
| 2,006,469 | Lucke | July 2, 1935 |
| 2,015,838 | Borden et al. | Oct. 1, 1935 |

OTHER REFERENCES

Page 824 of Diesel Engineering Handbook, de luxe edition by L. H. Morrison, published by Diesel Publication, Inc., 192 Lexington Avenue, N. Y. C., copyright 1935. (A copy of this publication may be found in Div. 28 of the U. S. Pat. Off.)

Pages 64 and 65 of Bulletin 156, Petroleum Technology, No. 44, Bureau of Mines, Dept. of Interior on The Diesel Engine—Its Fuels and Its Uses, by Herbert Haas, published by the Washington Government Printing Off. in 1918. (A copy of this publication may be found in Div. 28 of the U. S. Pat. Off.)